US010205182B2

(12) United States Patent
Wakabayashi et al.

(10) Patent No.: US 10,205,182 B2
(45) Date of Patent: Feb. 12, 2019

(54) FUEL CELL SYSTEM

(71) Applicant: HONDA MOTOR CO., LTD., Tokyo (JP)

(72) Inventors: Takuya Wakabayashi, Wako (JP); Toshihiro Yamaki, Wako (JP); Masakazu Hamachi, Wako (JP); Hiroyuki Murase, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/299,463

(22) Filed: Oct. 21, 2016

(65) Prior Publication Data
US 2017/0117561 A1    Apr. 27, 2017

(30) Foreign Application Priority Data

Oct. 21, 2015    (JP) .................................. 2015-206976

(51) Int. Cl.
*H01M 8/0276*    (2016.01)
*H01M 8/04082*   (2016.01)
(Continued)

(52) U.S. Cl.
CPC ... *H01M 8/04201* (2013.01); *H01M 8/04029* (2013.01); *H01M 8/04089* (2013.01);
(Continued)

(58) Field of Classification Search
CPC ......... H01M 2220/20; H01M 2250/20; H01M 8/04029; H01M 8/04089; H01M 8/04126; H01M 8/04201
See application file for complete search history.

(56) References Cited

U.S. PATENT DOCUMENTS

2007/0238008 A1*  10/2007  Hogan ................... B60R 13/08
                                                        219/458.1
2010/0151291 A1*   6/2010  Takagi .............. H01M 8/04089
                                                         429/429
2013/0078543 A1*   3/2013  Chiba ................. H01M 8/0267
                                                         429/437

FOREIGN PATENT DOCUMENTS

JP    2007-087760    4/2007
JP    2010-177166    8/2010
(Continued)

OTHER PUBLICATIONS

Japanese Office Action for corresponding JP Application No. 2015-206976, dated Aug. 28, 2018 (w/ machine translation).

*Primary Examiner* — Stewart A Fraser
*Assistant Examiner* — Victoria H Lynch
(74) *Attorney, Agent, or Firm* — Mori & Ward, LLP

(57) ABSTRACT

Oxidant gas flows to the fuel cell stack through an oxidant gas supply channel. Oxidant off-gas is discharged from the fuel cell stack through an oxidant off-gas exhaust channel. A refrigerant is discharged from the fuel cell stack through a refrigerant exhaust channel. An outlet sealing valve is provided in the oxidant off-gas exhaust channel. The outlet sealing valve includes a main body, a valve seat, a valve body, and a refrigerant passage. The main body has a passage through which the oxidant off-gas flows. The valve seat is provided in the passage. The valve body is provided in the passage to be seated on the valve seat to close the passage. The refrigerant passage is branched off from the refrigerant exhaust channel. The refrigerant flows in a vicinity of at least one of the valve seat and the valve body through the refrigerant passage.

12 Claims, 10 Drawing Sheets

(51) Int. Cl.
*H01M 8/04119* (2016.01)
*H01M 8/04029* (2016.01)
*H01M 8/04089* (2016.01)

(52) U.S. Cl.
CPC .... *H01M 8/04126* (2013.01); *H01M 2220/20* (2013.01); *H01M 2250/20* (2013.01); *Y02T 90/32* (2013.01)

(56) References Cited

FOREIGN PATENT DOCUMENTS

| JP | 2011-204500 | 10/2011 |
| JP | 2012-178029 | 9/2012 |
| JP | 2013-008444 | 1/2013 |
| JP | 2013-191430 | 9/2013 |
| JP | 2015-002009 | 1/2015 |
| JP | 2015-159005 | 9/2015 |

* cited by examiner

FUEL CELL SYSTEM

CROSS-REFERENCE TO RELATED APPLICATIONS

The present application claims priority under 35 U.S.C. § 119 to Japanese Patent Application No. 2015-206976, filed Oct. 21, 2015, entitled "Fuel Cell System." The contents of this application are incorporated herein by reference in their entirety.

BACKGROUND

1. Field

The present disclosure relates to a fuel cell system.

2. Description of the Related Art

A fuel cell receives supply of hydrogen (fuel gas) and air containing oxygen (oxidant gas) to generate electricity. Such a fuel cell has a favorable generation temperature (80° C. to 90° C. in the case of a PEFC, for example), at which electricity is favorably generated, corresponding to the type of a catalyst (for example, Pt) which causes an electrode reaction of hydrogen or air.

In a fuel cell system according to Japanese Unexamined Patent Application Publication No. 2013-191430, an inlet sealing valve is provided in an oxidant gas supply channel which supplies air to a cathode of a fuel cell, and an outlet sealing valve is provided in an oxidant off-gas exhaust channel which exhausts cathode off-gas.

During a halt to electricity generation by a fuel cell, the inlet sealing valve and the outlet sealing valve are closed to seal a cathode passage and to inhibit a highly active OH radical (hydroxyl radical) or the like from being produced.

This prevents an electrode catalyst layer from being oxidized by a hydroxyl radical to deteriorate the fuel cell.

A fuel cell system is mounted on a vehicle and used as a power source for driving a motor, as disclosed in Japanese Unexamined Patent Application Publication No. 2015-159005.

SUMMARY

According to one aspect of the present invention, a fuel cell system includes a fuel cell stack, an oxidant gas supply channel through which oxidant gas to be supplied to the fuel cell stack flows, an oxidant off-gas exhaust channel through which oxidant off-gas exhausted from the fuel cell stack flows, an outlet sealing valve which is provided in the oxidant off-gas exhaust channel, and a refrigerant exhaust channel through which a refrigerant exhausted from the fuel cell stack flows. The outlet sealing valve includes a main body portion having a passage through which the oxidant off-gas flows, a valve seat which is provided in the passage, a valve body which is provided in the passage and is seated on the valve seat to close the passage, and a refrigerant passage which is located in the vicinity of the valve seat or in the vicinity of the valve body and through which a branch of the refrigerant from the refrigerant exhaust channel flows.

According to another aspect of the present invention, a fuel cell system includes a fuel cell stack, an oxidant gas supply channel, an oxidant off-gas exhaust channel, a refrigerant exhaust channel, and an outlet sealing valve. Oxidant gas flows to the fuel cell stack through the oxidant gas supply channel. Oxidant off-gas is discharged from the fuel cell stack through the oxidant off-gas exhaust channel. A refrigerant is discharged from the fuel cell stack through the refrigerant exhaust channel. The outlet sealing valve is provided in the oxidant off-gas exhaust channel. The outlet sealing valve includes a main body, a valve seat, a valve body, and a refrigerant passage. The main body has a passage through which the oxidant off-gas flows. The valve seat is provided in the passage. The valve body is provided in the passage to be seated on the valve seat to close the passage. The refrigerant passage is branched off from the refrigerant exhaust channel. The refrigerant flows in a vicinity of at least one of the valve seat and the valve body through the refrigerant passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE PREFERRED EMBODIMENTS

Figure 1:
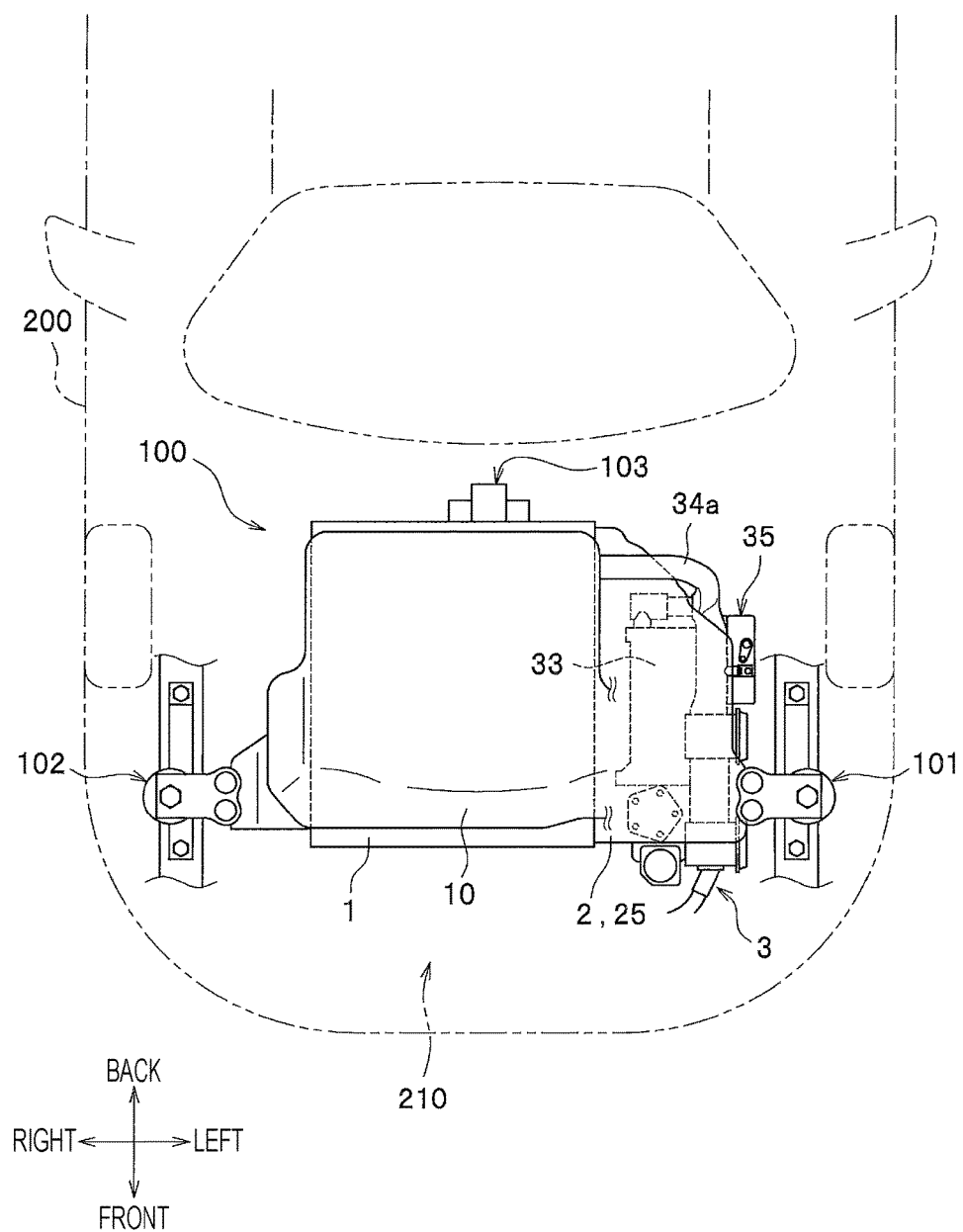
FIG. 1 is a plan view of a fuel cell electric vehicle with a fuel cell system mounted therein, as viewed from above.

The embodiments will now be described with reference to the accompanying drawings, wherein like reference numerals designate corresponding or identical elements throughout the various drawings.

A fuel cell electric vehicle including a fuel cell system according to an embodiment will be described.

(Fuel Cell Electric Vehicle)

As shown in FIG. 1, a fuel cell electric vehicle 200 includes a fuel cell system 100 which generates electricity by causing an electrochemical reaction between hydrogen supplied from a hydrogen tank (not shown) and air (oxygen) taken in from outside the vehicle, and a motor (not shown) for driving wheels (front wheels).

The fuel cell system 100 and the motor are mounted in a vehicle body space 210 of a front body of the fuel cell electric vehicle 200.

The fuel cell system 100 is supported by a first lateral mount 101 and a second lateral mount 102 which are located on two sides in a vehicle width direction of the fuel cell system 100 and a shared mount 103 which is located behind the fuel cell system 100, and is arranged above the motor.

Note that the shared mount 103 is located behind the motor and supports the motor.

(Fuel Cell System)

As shown in FIG. 1, the fuel cell system 100 includes a fuel cell stack 1 which is located substantially at the center in the vehicle width direction, an anode system 2 which is stored in an anode system cover 25 and is fixed to the left of the fuel cell stack 1, a cathode system 3 which is fixed below the anode system 2, a refrigerant system 4 (not shown in FIG. 1) which causes a refrigerant to circulate through the fuel cell stack 1, and a voltage and current control unit 10 which is fixed above the fuel cell stack 1.

(Fuel Cell Stack)

The fuel cell stack 1 is a solid polymer electrolyte fuel cell (PEFC) and is composed of a plurality of stacked cells, each having a membrane electrode assembly (MEA) sandwiched between one pair of conductive separators.

In the present embodiment, a stacking direction for the cells is the vehicle width direction, and one pair of terminal plates, one pair of insulating plates, and one pair of end plates are provided in order on two respective sides in the stacking direction.

Although not specifically shown, a hydrogen supply port and a hydrogen exhaust port which are connected to the anode system 2 and an oxygen supply port and an oxygen exhaust port which are connected to the cathode system 3 are provided in a left side surface of the fuel cell stack 1.

Additionally, a manifold for refrigerant supply and a manifold for refrigerant exhaust which are connected to the refrigerant system 4 are provided on a right side surface of the fuel cell stack 1.

(Anode System)

The anode system 2 is intended to supply or exhaust hydrogen to or from an anode of the fuel cell stack 1.

Figure 2:
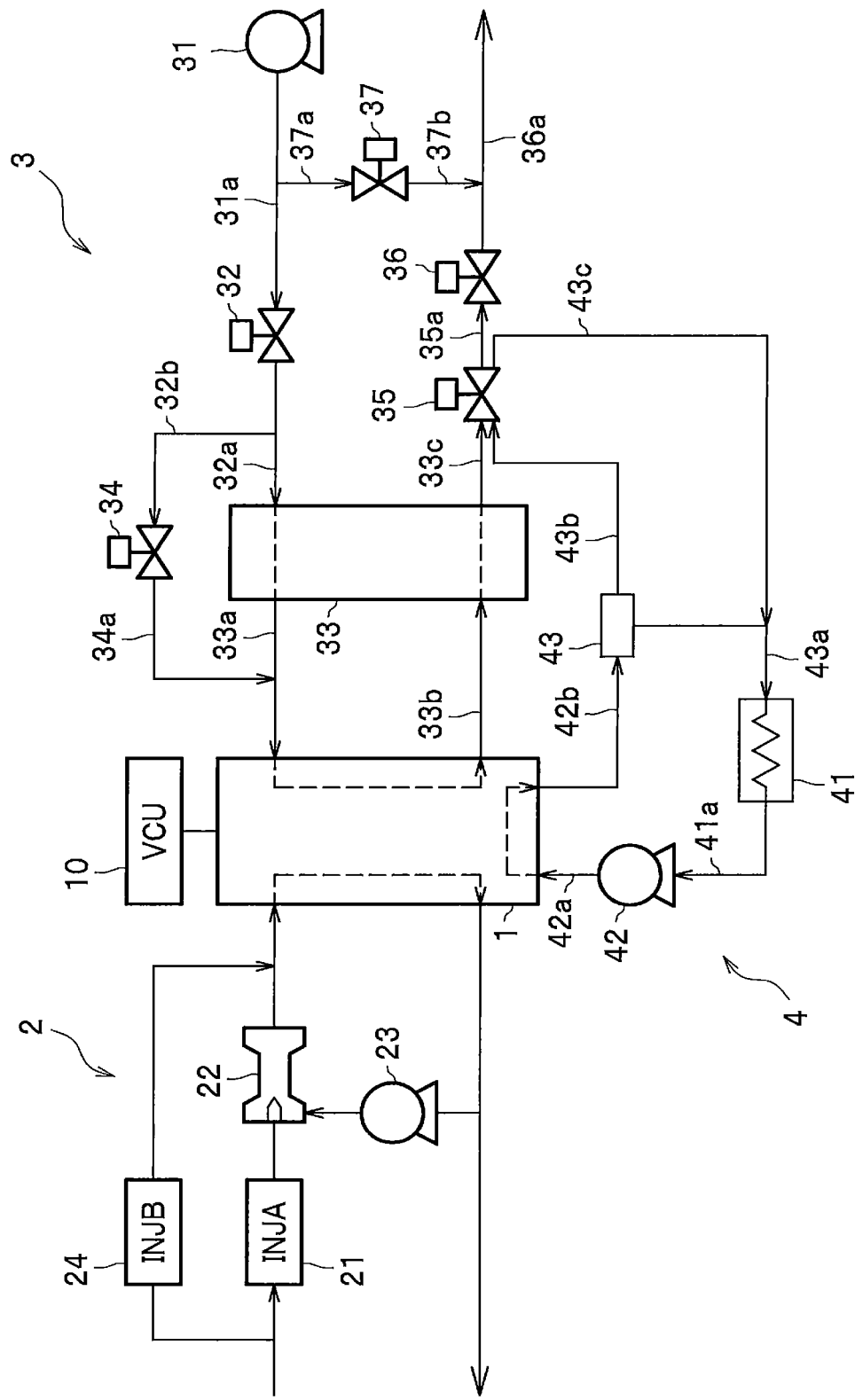
FIG. 2 is an overall configuration diagram of the fuel cell system.

As shown in FIG. 2, the anode system 2 includes a first injector 21 which injects, at a predetermined pressure, hydrogen supplied from the hydrogen tank, an ejector 22 which sucks in anode off-gas, mixes the anode off-gas with new hydrogen, and injects the mixture at a predetermined pressure, a circulating pump 23 for circulating anode off-gas exhausted from the hydrogen exhaust port of the fuel cell stack 1, and a second injector 24 which bypasses the first injector 21 and the ejector 22 and injects hydrogen at a predetermined pressure.

(Anode System Cover)

The anode system cover 25 is a housing which is made of an aluminum alloy and has relatively high rigidity and protects pieces of equipment of the anode system 2 from a load at the time of a vehicle collision. Since the anode system cover 25 surrounds the anode system 2, the anode system cover 25 functions as a sound-proof wall which makes it harder for a driver to hear working noise from the first injector 21 or the like, or functions as a container which keeps hydrogen leaking out from the anode system 2 from diffusing into a motor room 110.

As shown in FIG. 1, the anode system cover 25 is fixed to the left side surface of the fuel cell stack 1 with bolts (not shown) to be integral with the fuel cell stack 1. Cathode System The cathode system 3 is intended to supply or exhaust air (oxygen) to or from a cathode of the fuel cell stack 1.

As shown in FIG. 2, the cathode system 3 includes an air pump 31 which pumps air (oxygen) to the fuel cell stack 1, an inlet sealing valve 32 which is provided in an oxygen supply channel (oxidant gas supply channel), a humidifier 33 which humidifies air (oxygen) circulating along the oxygen supply channel, a humidifier bypass valve 34 which is provided in a humidifier bypass channel bypassing the humidifier 33, an outlet sealing valve 35 which is provided in an oxygen exhaust channel (oxidant off-gas exhaust channel), a back pressure valve 36 which adjusts a cathode pressure in a cathode passage, and a stack bypass valve 37 which is provided in a stack bypass channel bypassing the fuel cell stack 1.

Note that the oxidant gas supply channel is composed of pieces 31a, 32a, and 33a of piping, and the oxidant off-gas exhaust channel is composed of pieces 33b, 33c, 35a, and 36a of piping.

The humidifier bypass channel is composed of a piece 32b of piping and a piece 34a of piping for humidifier bypassing, and the stack bypass channel is composed of pieces 37a and 37b of piping.

Figure 3:
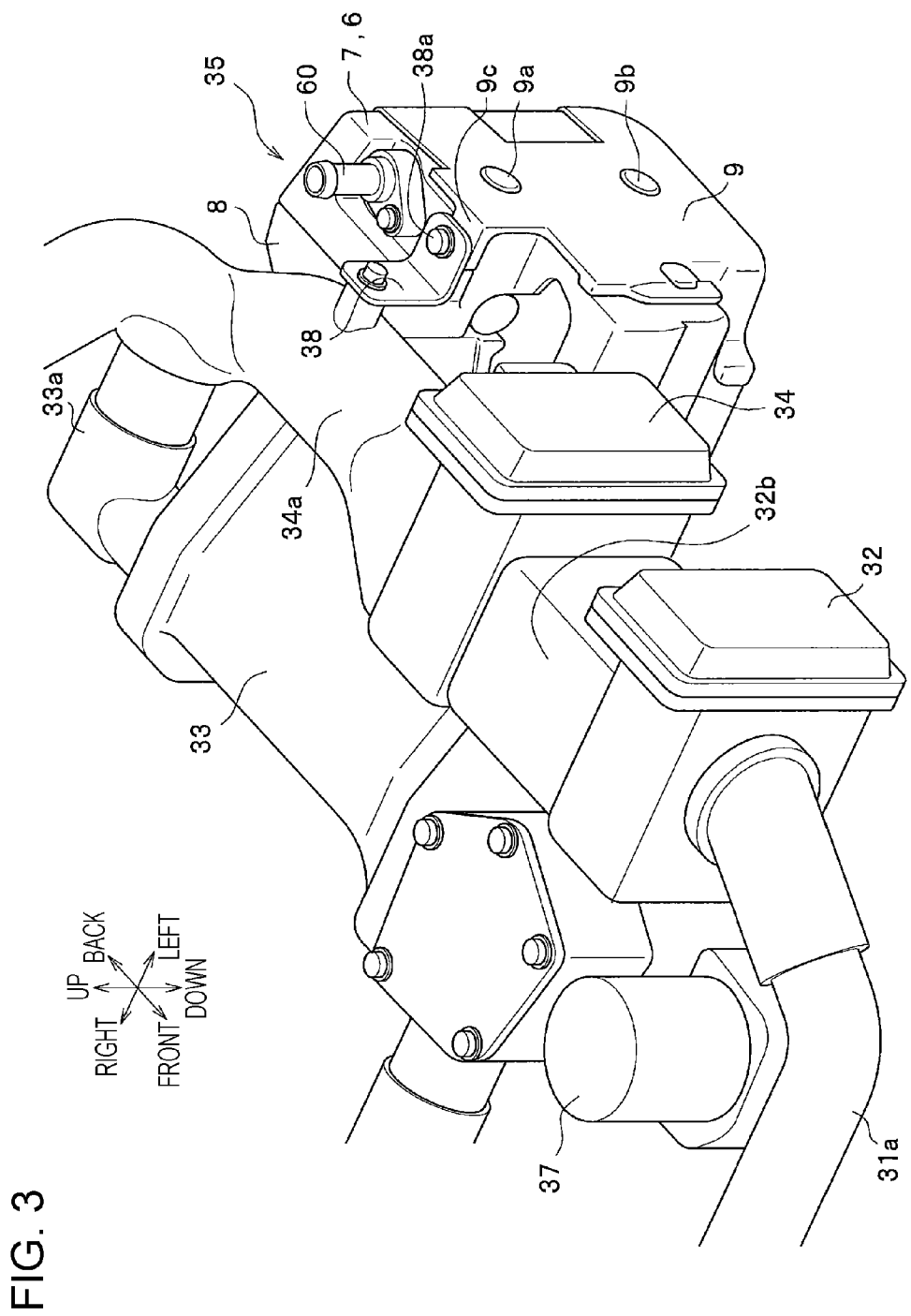
FIG. 3 is a perspective view of a cathode system as viewed from the upper left on the front side.

As shown in FIGS. 1 and 3, arrangement of pieces of equipment constituting the cathode system 3 is such that the humidifier 33 largest in volume is arranged closer to the fuel cell stack 1 to achieve high space efficiency. Note that the stack bypass valve 37 is arranged in front of the humidifier 33.

As shown in FIG. 3, the inlet sealing valve 32, the piece 32b of piping, the humidifier bypass valve 34, and the piece 34a of piping for humidifier bypassing are arranged to the left of the stack bypass valve 37 and the humidifier 33.

The outlet sealing valve 35 is arranged to the left of and below the piece 34a of piping for humidifier bypassing, and the outlet sealing valve 35 is farthest away from the fuel cell stack 1 in the vehicle width direction (see FIG. 1). For this reason, even during operation of the fuel cell system 100, the outlet sealing valve 35 is hard to heat by the fuel cell stack 1.

Additionally, the piece 34a of piping for humidifier bypassing is made of metal, and the outlet sealing valve 35 is attached to the piece 34a of piping for humidifier bypassing by an L-shaped coupling member 38.

The details of the outlet sealing valve 35 will be described later.

(Refrigerant System)

The refrigerant system 4 is intended to circulate a refrigerant such that the refrigerant goes through the fuel cell stack 1. As shown in FIG. 2, the refrigerant system 4 includes a radiator 41 for causing a refrigerant to dissipate heat, a refrigerant pump 42 which is provided in a refrigerant supply channel, and a branched pipe 43 which is provided in a refrigerant exhaust channel.

A branch of a refrigerant from the branched pipe 43 circulates through the outlet sealing valve 35 via a piece 43b of piping constituting a refrigerant branch channel and returns to the refrigerant exhaust channel via a piece 43c of piping constituting a refrigerant return channel.

Note that the refrigerant supply channel is composed of pieces 41a and 42a of piping and that the refrigerant exhaust channel is composed of pieces 42b and 43a of piping.

Voltage and Current Control Unit

The voltage and current control unit 10 is connected to one pair of output terminals (not shown) of the fuel cell stack 1 and performs control of generated output of the fuel cell stack 1 and other processing.

The outlet sealing valve 35 will be described.

Figure 4:
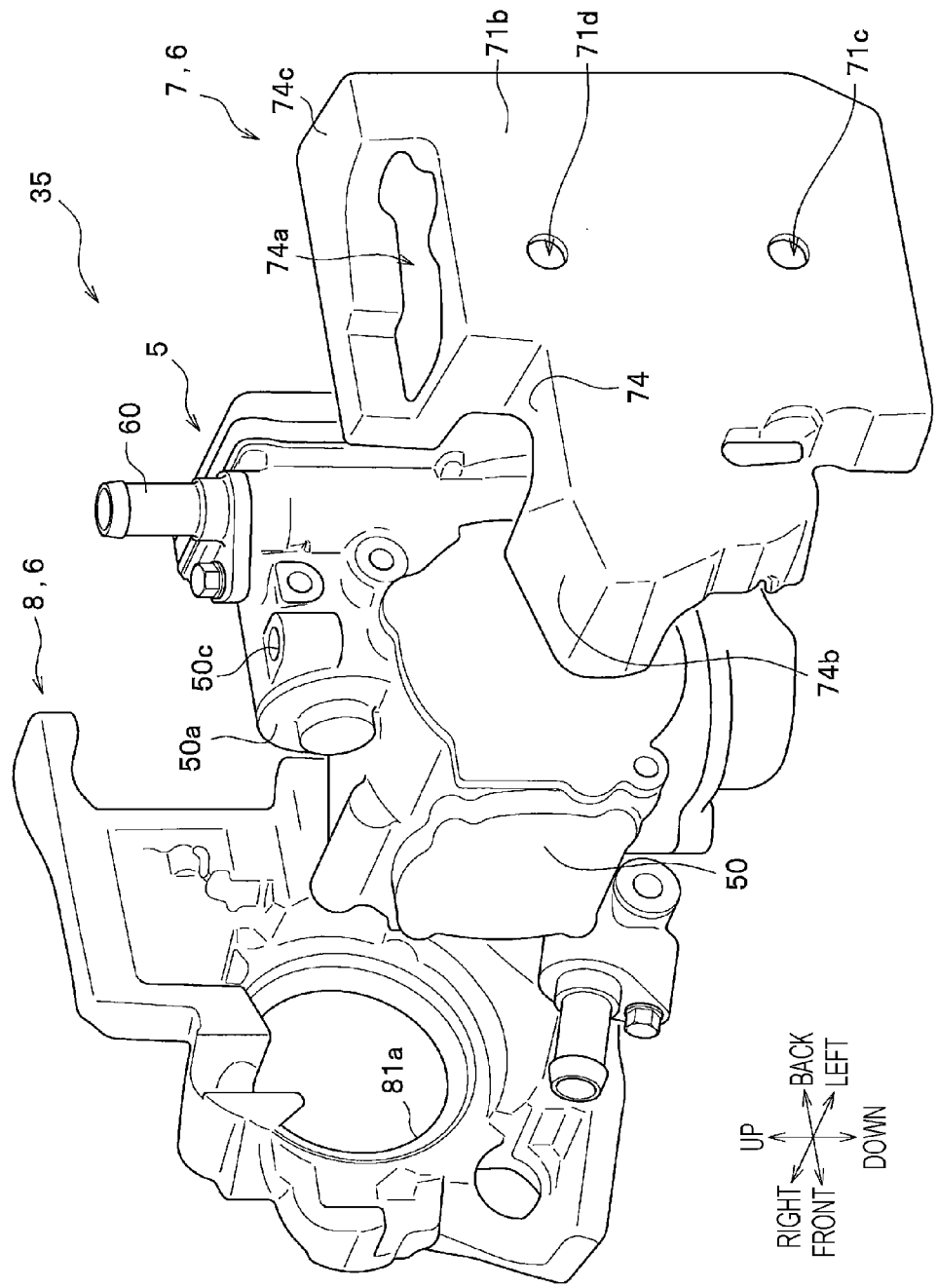
FIG. 4 is an exploded perspective view of an outlet sealing valve.

As shown in FIG. 4, the outlet sealing valve 35 includes a sealing valve main body 5, an insulation cover 6 made of polyurethane, and a resin cover 9 (see FIG. 3) made of resin.

Sealing Valve Main Body

Figure 5:
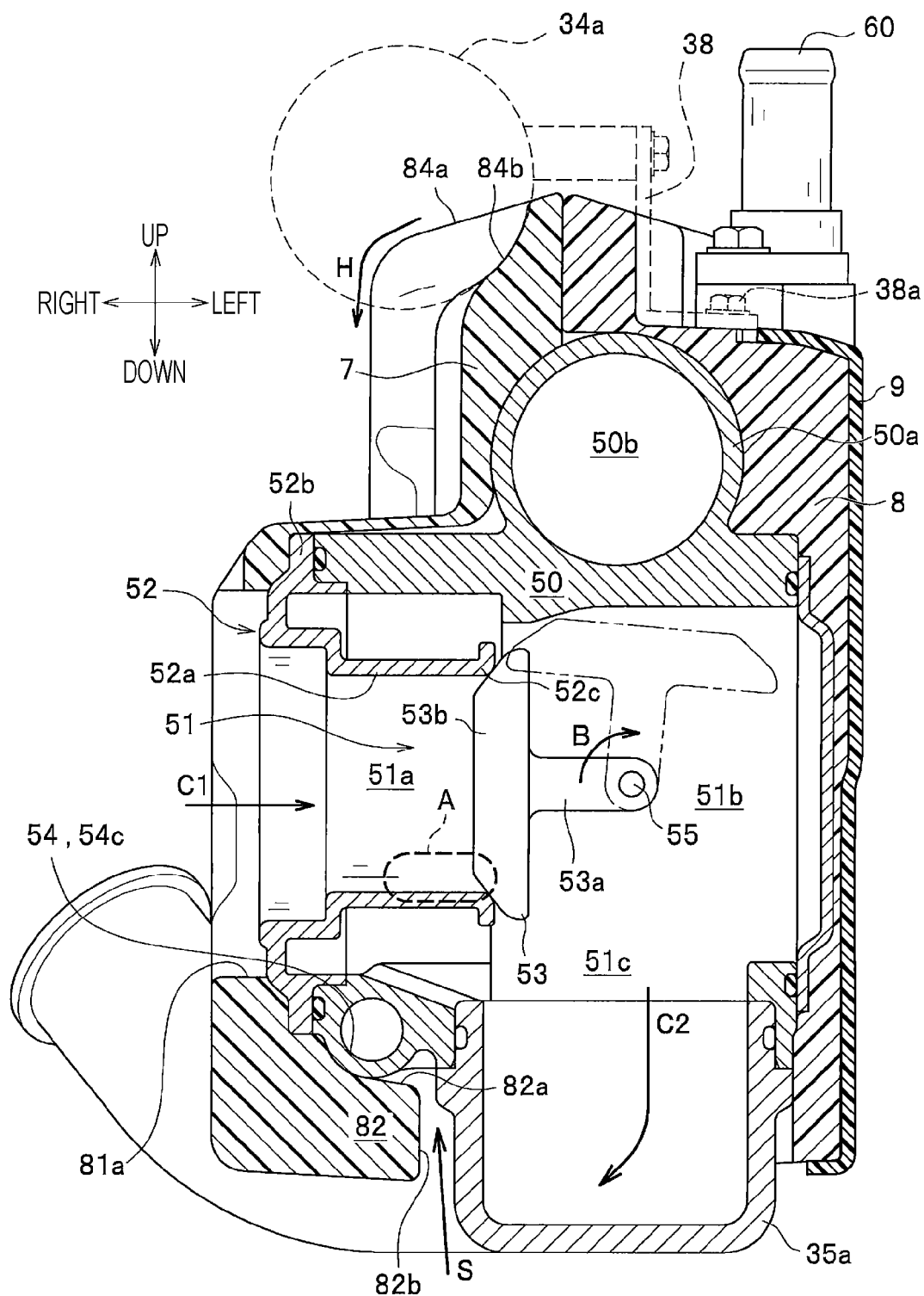
FIG. 5 is a cross-sectional view of a valve device, which is taken along a vertical line with respect to a longitudinal axis, as viewed from the front.

As shown in FIG. 5, the sealing valve main body 5 includes a main body portion 50 having a passage 51, through which oxidant off-gas flows, a valve seat 52, a valve body 53, and a refrigerant passage 54 which extends through the main body portion 50.

Main Body Portion

An outer shape of the main body portion 50 is a substantially cubic shape.

Figure 6:
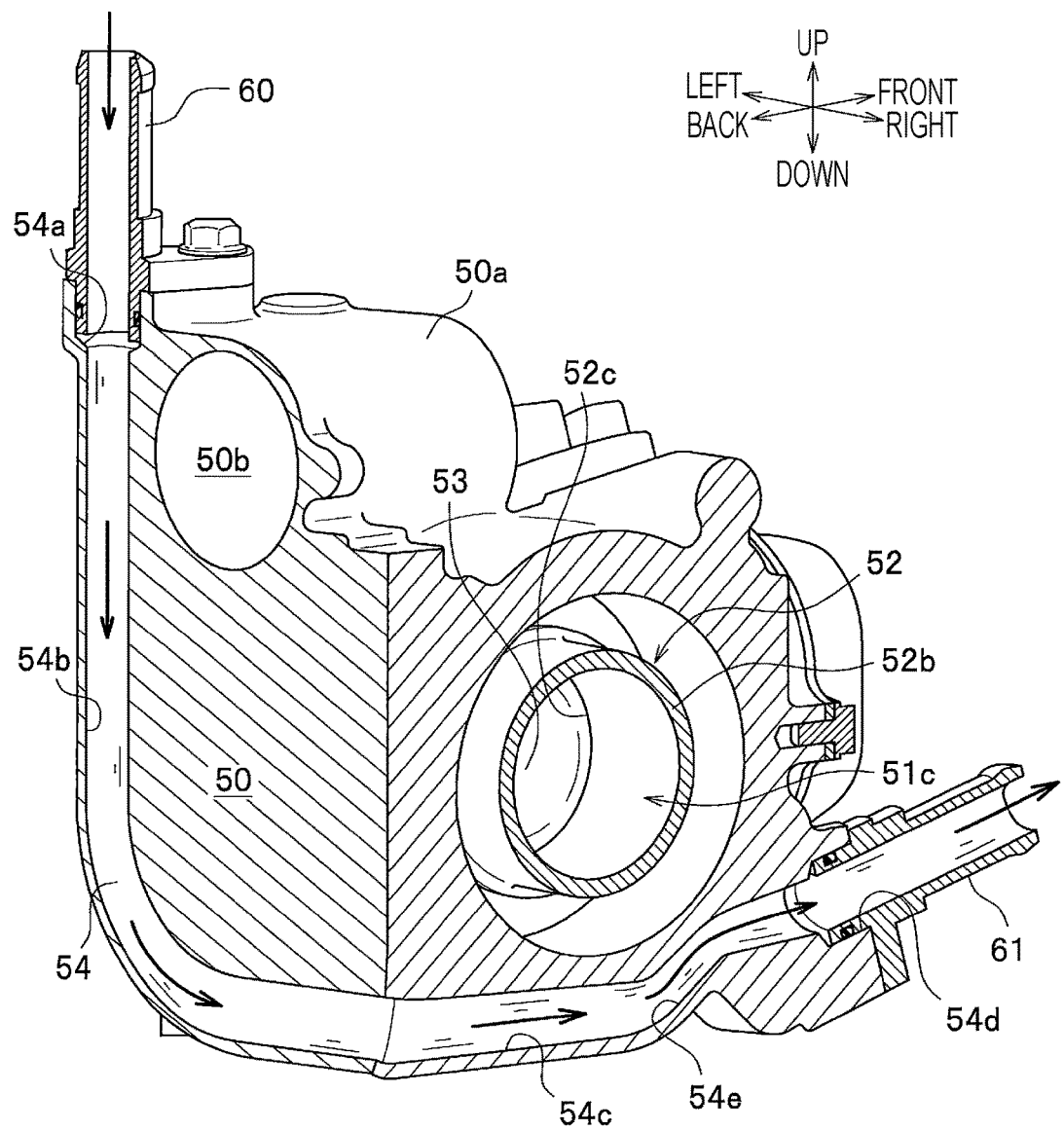
FIG. 6 is a cross-sectional view of a main body portion taken along a refrigerant passage.

As shown in FIGS. 4 to 6, a motor housing portion 50a which protrudes upward is formed at an upper portion on the rear side of the main body portion 50.

A space 50b for housing a valve body motor (not shown) for working the valve body 53 is formed in the motor housing portion 50a.

As shown in FIG. 4, a threaded hole 50c which is open to above is formed in an upper surface of the motor housing portion 50a.

The threaded hole 50c is exposed to the outside via an opening portion 74a (to be described later) of the insulation cover 6 (a first insulation cover 7).

As shown in FIG. 3, a screw 38a which extends through the coupling member 38 fixed to the piece 34a of piping for humidifier bypassing screws into the threaded hole 50c, and the outlet sealing valve 35 is fixed to the piece 34a of piping for humidifier bypassing.

Passage

As shown in FIG. 5, the passage 51 includes an inflow port 51a which extends through a right surface of the main body portion 50, a central passage 51b which is formed in a central portion of the main body portion 50 and is continuous with the inflow port 51a, and an outflow port 51c which extends downward from the central passage 51b and extends through a lower surface of the main body portion 50 and is formed in an L-shape.

Note that a shaft member 55 which extends in a longitudinal direction is provided in the central passage 51b. The shaft member 55 is configured to pivot in accordance with driving of the valve body motor.

The piece 35a of piping is connected to the outflow port 51c.

(Valve Seat)

The valve seat 52 includes a hollow cylinder portion 52a which extends in a lateral direction in the inflow port 51a, a collar portion 52b which extends outwardly in a radial direction from a left end portion of the hollow cylinder portion 52a and is attached to the inflow port 51a, and a seating surface 52c which is an inner peripheral edge on the right side of the hollow cylinder portion 52a and on which the valve body 53 is to be seated.

(Valve Body)

The valve body 53 includes a solid cylindrical base portion 53a which is attached to the shaft member 55 in the central passage 51b and a disk-shaped seated portion 53b which is provided at a distal end of the base portion 53a.

If the shaft member 55 pivots in accordance with driving of the valve body motor, and the base portion 53a faces to the right, the seated portion 53b is seated on the seating surface 52c of the valve seat 52 to close the inflow port 51a.

Accordingly, water flowing into the inflow port 51a builds up on the lower side of the hollow cylinder portion 52a (the valve seat 52) (see a spot surrounded by a broken line A in FIG. 5).

If the shaft member 55 pivots in accordance with driving of the valve body motor (not shown), and the base portion 53a faces upward (see an arrow B in FIG. 5), the seated portion 53b moves upward to open the inflow port 51a. Accordingly, oxidant off-gas passing through the humidifier 33 and going toward the inflow port 51a passes through the central passage 51b and the outflow port 51c and flows into the piece 35a of piping (see arrows C1 and C2 in FIG. 5).

Refrigerant Passage

As shown in FIG. 6, the refrigerant passage 54 includes a refrigerant inflow port 54a which extends through the left rear side of the upper surface of the motor housing portion 50a, an L-shaped first refrigerant passage 54b which extends downward from the refrigerant inflow port 54a and bends to the right in the vicinity of a bottom surface of the main body portion 50, a second refrigerant passage 54c which extends forward from the first refrigerant passage 54b, and a refrigerant outflow port 54d which extends through a front surface of the main body portion 50.

A port 60 for refrigerant inflow is attached to the refrigerant inflow port 54a.

A port 61 for refrigerant outflow is attached to the refrigerant outflow port 54d.

The piece 43b of piping (see FIG. 2) constituting the refrigerant branch channel of the refrigerant system 4 is connected to the port 60 for refrigerant inflow.

The piece 43c of piping (see FIG. 2) constituting the refrigerant return channel of the refrigerant system 4 is connected to the port 61 for refrigerant outflow.

As seen from the foregoing, during operation of the fuel cell system 100, a refrigerant having absorbed heat of the fuel cell stack 1 flows through the refrigerant passage 54 (see arrows in FIG. 6).

As shown in FIGS. 5 and 6, the second refrigerant passage 54c extends below the inflow port 51a extending in the vehicle width direction and is located in the vicinity of the valve seat 52. For this reason, when a refrigerant flows through the second refrigerant passage 54c, the lower side of the valve seat 52 is heated via the main body portion 50.

The second refrigerant passage 54c has a curved portion 54e which curves upward along the valve seat 52, and a larger portion on the lower side of the valve seat 52 is heated.

As seen from the foregoing, even after the fuel cell system 100 halts, and the outlet sealing valve 35 is closed, a temperature on the lower side of the valve seat 52 is relatively high. Accordingly, water which remains on the lower side of the valve seat 52 (see the spot surrounded by the broken line A in FIG. 5) does not freeze, and the valve body 53 is not firmly fixed to the valve seat 52.

The refrigerant passage 54 has the first refrigerant passage 54b besides the second refrigerant passage 54c, and the whole of the main body portion 50 is heated. Accordingly, freezing is unlikely to occur in the passage 51 of the main body portion 50.

Insulation Cover

The insulation cover 6 is intended to prevent heat from escaping easily from the main body portion 50 (the valve seat 52) heated through refrigerant supply. With the insulation cover 6, even after refrigerant supply (heat source supply) to the refrigerant passage 54 halts due to a system halt of the fuel cell system 100, the main body portion 50 is harder to cool.

As shown in FIG. 4, the insulation cover 6 includes the first insulation cover 7 that is arranged on the outer side (the left side) in the vehicle width direction that is the opposite side of the sealing valve main body 5 from the fuel cell stack 1, and a second insulation cover 8 which is arranged on the same side as the fuel cell stack 1 (the right side).

As shown in FIG. 5, the first insulation cover 7 surrounds a left half of the main body portion 50 while the second insulation cover 8 surrounds a right half of the main body portion 50.

The first insulation cover 7 and the second insulation cover 8 are each made of polyurethane having high thermal insulation.

First Insulation Cover

Figure 7:
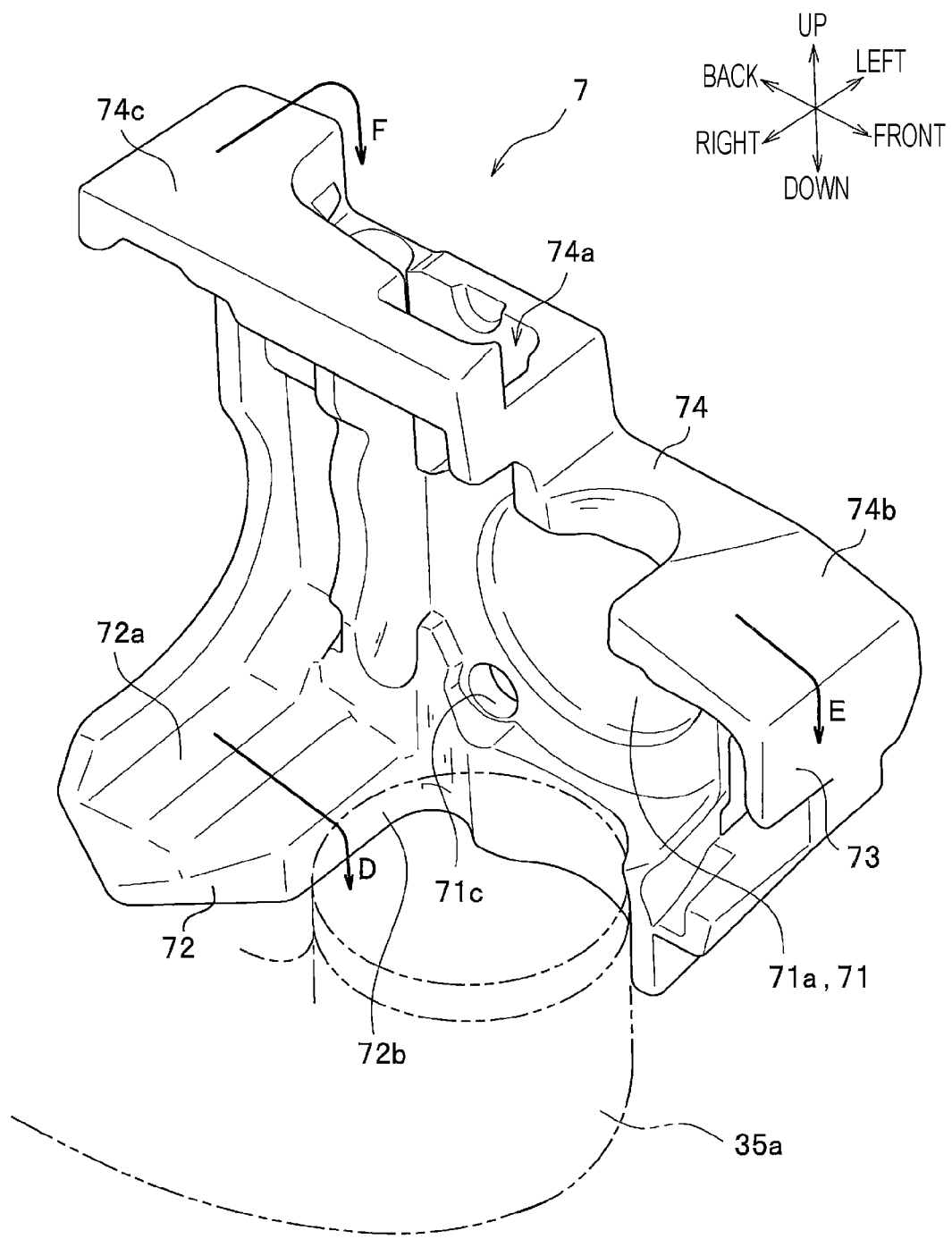
FIG. 7 is a perspective view of a first insulation cover as viewed from the upper right on the front side.

As shown in FIG. 7, the first insulation cover 7 includes a left-side wall portion 71 which is arranged to the left of the main body portion 50, a left-side lower wall portion 72 which extends from a lower edge of the left-side wall portion 71 to the right, a left-side front wall portion 73 which extends from a front edge of the left-side wall portion 71 to the right, and a left-side upper wall portion 74 which extends from an upper edge of the left-side wall portion 71 to the right.

A right side surface 71a of the left-side wall portion 71 is an inner wall surface and has projections and recesses formed so as to correspond to the outer shape of the main body portion 50.

As shown in FIG. 4, a left side surface 71b of the left-side wall portion 71 has a planar shape.

Mounting holes 71c and 71d, through which clips 9a and 9b (see FIG. 3) for attaching the resin cover 9 to the main body portion 50 extend, are formed in the left-side wall portion 71.

The left-side lower wall portion 72 is intended to cover the rear side of the lower surface of the main body portion 50. Note that the piece 35a of piping connected to the outflow port 51c of the main body portion 50 is arranged in front of the left-side lower wall portion 72.

A first inclined surface 72a which inclines downward from back to front is formed at an upper surface of the left-side lower wall portion 72.

A front end face 72b of the left-side lower wall portion 72 is separate from the piece 35a of piping, and a gap is formed between the front end face 72b and the piece 35a of piping.

With the above-described configuration, water on the first inclined surface 72a derived from condensation flows forward along the first inclined surface 72a and flows downward between the front end face 72b and the piece 35a of piping (see an arrow D in FIG. 7). This reduces water deposited on the left-side lower wall portion 72 and makes the first insulation cover 7 harder to cool.

As shown in FIG. 7, an opening portion 74a is formed in the left-side upper wall portion 74 closer to the back.

The opening portion 74a is intended to expose the threaded hole 50c of the main body portion 50 and arrange the port 60 for refrigerant inflow outside (see FIG. 3).

A second inclined surface 74b which inclines downward from back to front is formed on the front side of an upper surface of the left-side upper wall portion 74. For this reason, water on the second inclined surface 74b derived from condensation flows forward and flows downward along the left-side front wall portion 73 (see an arrow E in FIG. 7).

A third inclined surface 74c which inclines downward from right to left is formed on the rear side of the upper surface of the left-side upper wall portion 74. For this reason, water on the third inclined surface 74c derived from condensation flows to the left and flows downward along the left-side wall portion 71 (see an arrow F in FIG. 7).

As shown in FIG. 3, the resin cover 9 is a thin-plate member formed in a substantially same shape as the left-side wall portion 71 of the first insulation cover 7 as viewed from the left and is attached to the main body portion 50 with the clips 9a and 9b.

The first insulation cover 7 is sandwiched between the main body portion 50 and the resin cover 9, and the left-side wall portion 71 of the first insulation cover 7 is in close contact with the main body portion 50.

An extending portion 9c which extends on the upper surface side of the first insulation cover 7 and is sandwiched between the coupling member 38 and the main body portion 50 is also provided at the resin cover 9.

Second Insulation Cover

Figure 8:
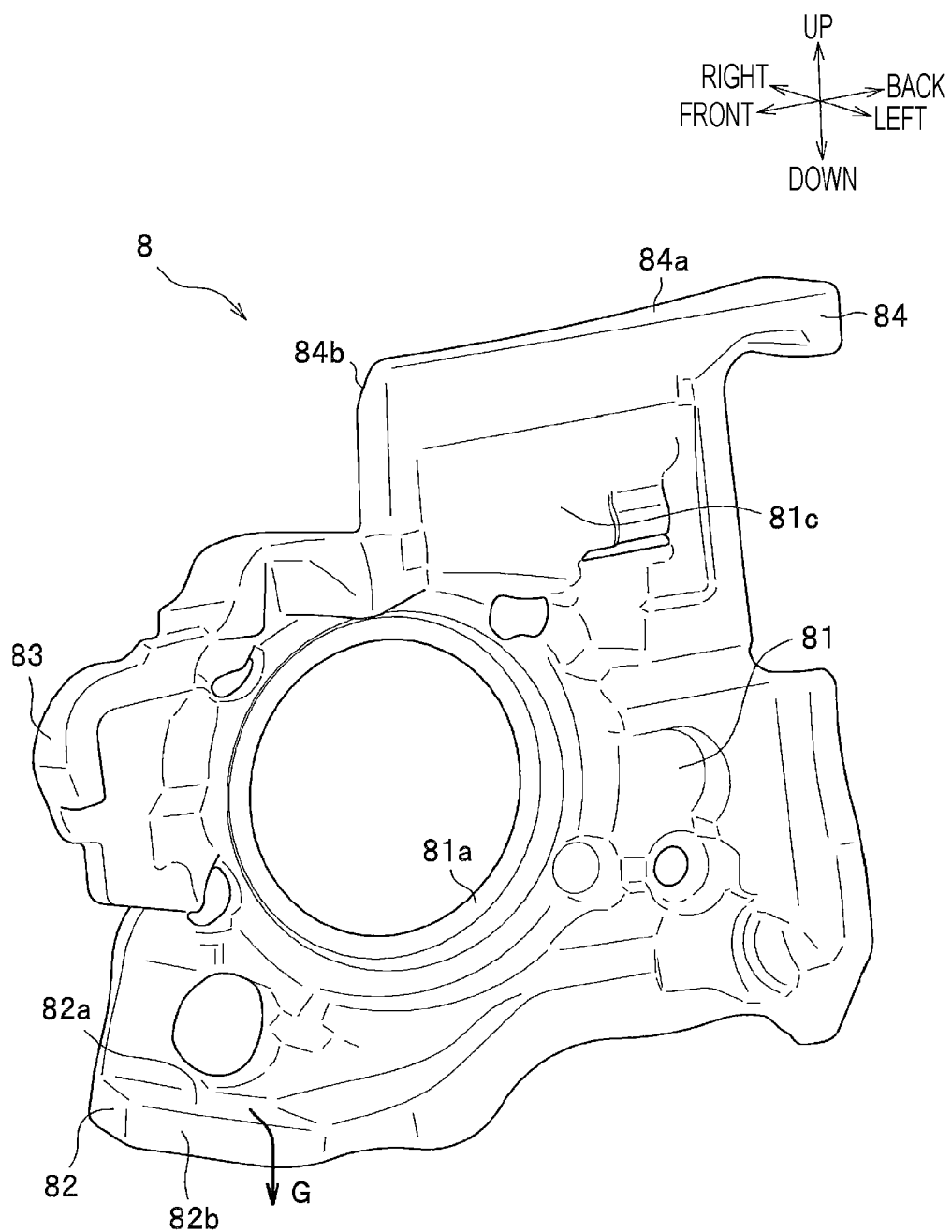
FIG. 8 is a perspective view of a second insulation cover as viewed from the upper left on the front side.

As shown in FIG. 8, the second insulation cover 8 includes a right-side wall portion 81 which is arranged to the right of the main body portion 50, a right-side lower wall portion 82 which extends from a lower edge of the right-side wall portion 81 to the left, a right-side front wall portion 83 which extends from a front edge of the right-side wall portion 81 to the left, and a right-side upper wall portion 84 which extends from an upper edge of the right-side wall portion 81 to the left.

A left side surface 81c of the right-side wall portion 81 has projections and recesses formed so as to correspond to the outer shape of the main body portion 50.

A through-hole 81a, through which the piece 33c of piping connected to the inflow port 51a of the outlet sealing valve 35 extends, is formed in the right-side wall portion 81.

Figure 9:
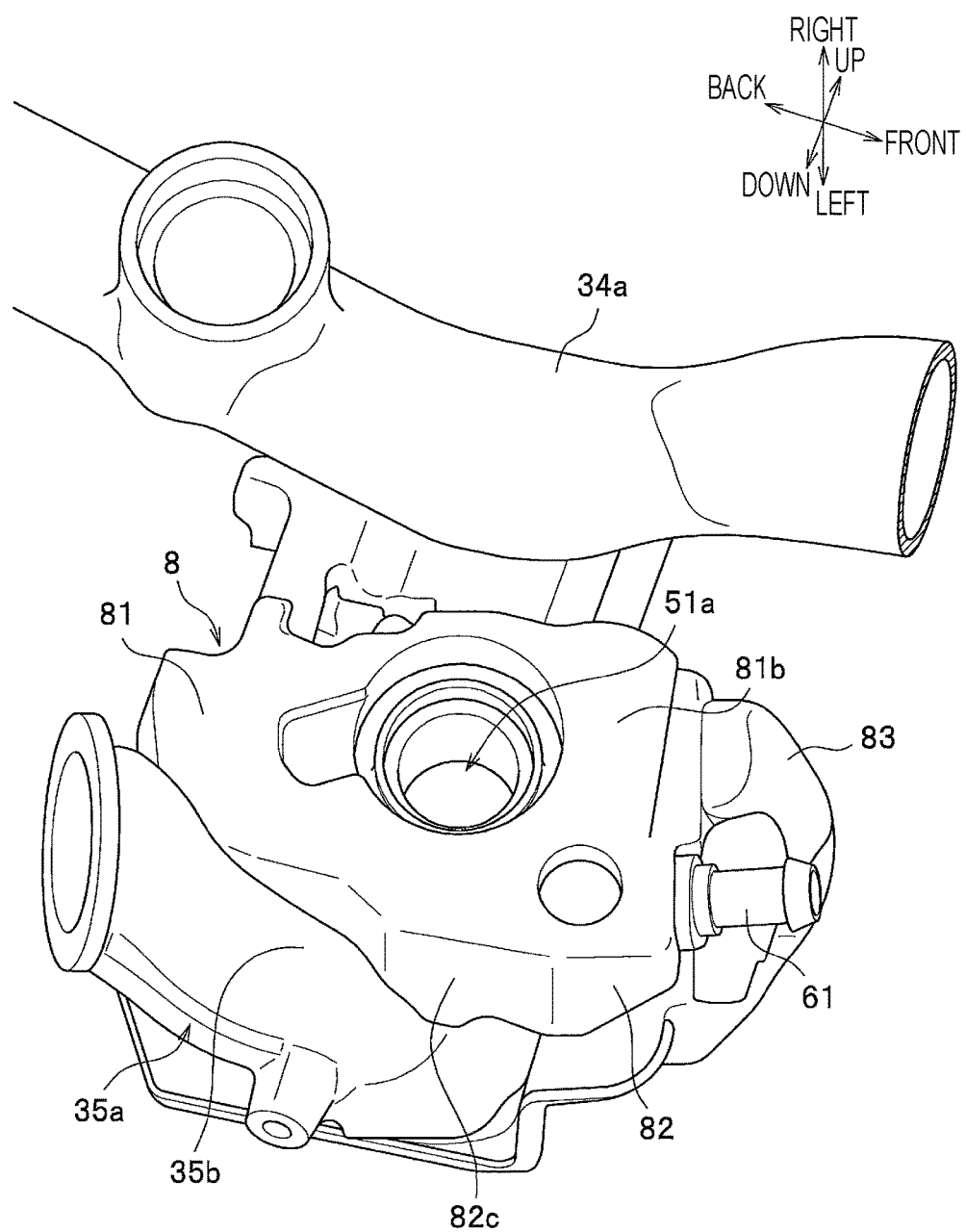
FIG. 9 is a perspective view of the outlet sealing valve as viewed from the lower right.

A right side surface 81b of the right-side wall portion 81 is formed in a planar shape (see FIG. 9).

The right-side lower wall portion 82 is intended to cover the front side of the lower surface of the main body portion 50.

Note that, as shown in FIG. 5, the piece 35a of piping connected to the outflow port 51c of the main body portion 50 is arranged to the left of the right-side lower wall portion 82. A left end face 82b of the right-side lower wall portion 82 is separate from the piece 35a of piping, and a gap S is formed between the left end face 82b and the piece 35a of piping.

As shown in FIG. 8, a fourth inclined surface 82a which inclines from right to left is formed at an upper surface of the right-side lower wall portion 82.

With the above-described configuration, water on the fourth inclined surface 82a derived from condensation flows forward along the fourth inclined surface 82a and flows downward between the left end face 82b and the piece 35a of piping (see an arrow G in FIG. 8).

Note that, as shown in FIG. 9, the piece 35a of piping extends rearward from the outflow port 51c of the outlet sealing valve 35 and that an upper surface of a middle portion 35b of the piece 35a of piping is in contact with a lower surface 82c of the right-side lower wall portion 82.

For this reason, a lower portion of the second insulation cover 8 is sandwiched between the piece 35a of piping and the main body portion 50 and is in close contact with the main body portion 50.

As shown in FIG. 8, a fifth inclined surface 84a is formed on the rear side of an upper surface of the right-side upper wall portion 84.

As shown in FIG. 5, the fifth inclined surface 84a inclines downward from left to right. Thus, water on the fifth inclined surface 84a derived from condensation flows to the right and flows downward along the right-side wall portion 81 (see an arrow H in FIG. 5).

A surface 84b to be contacted formed in an arc shape, which the piece 34a of piping for humidifier bypassing contacts, is formed at a central portion of the right-side upper wall portion 84. For this reason, an upper portion of the second insulation cover 8 is sandwiched between the main body portion 50 and the piece 34a of piping for humidifier bypassing and is in close contact with the main body portion 50.

Effects of the fuel cell system 100 according to the present embodiment will now be described with reference to FIG. 10.

When an ignition switch (IG) of the fuel cell electric vehicle 200 is on, a refrigerant sent by the refrigerant pump 42 circulates through a refrigerant passage in the fuel cell stack 1 and is heated. After that, the refrigerant flows through the refrigerant passage 54 of the outlet sealing valve 35 to heat the valve seat 52 of the outlet sealing valve 35.

Figure 10:
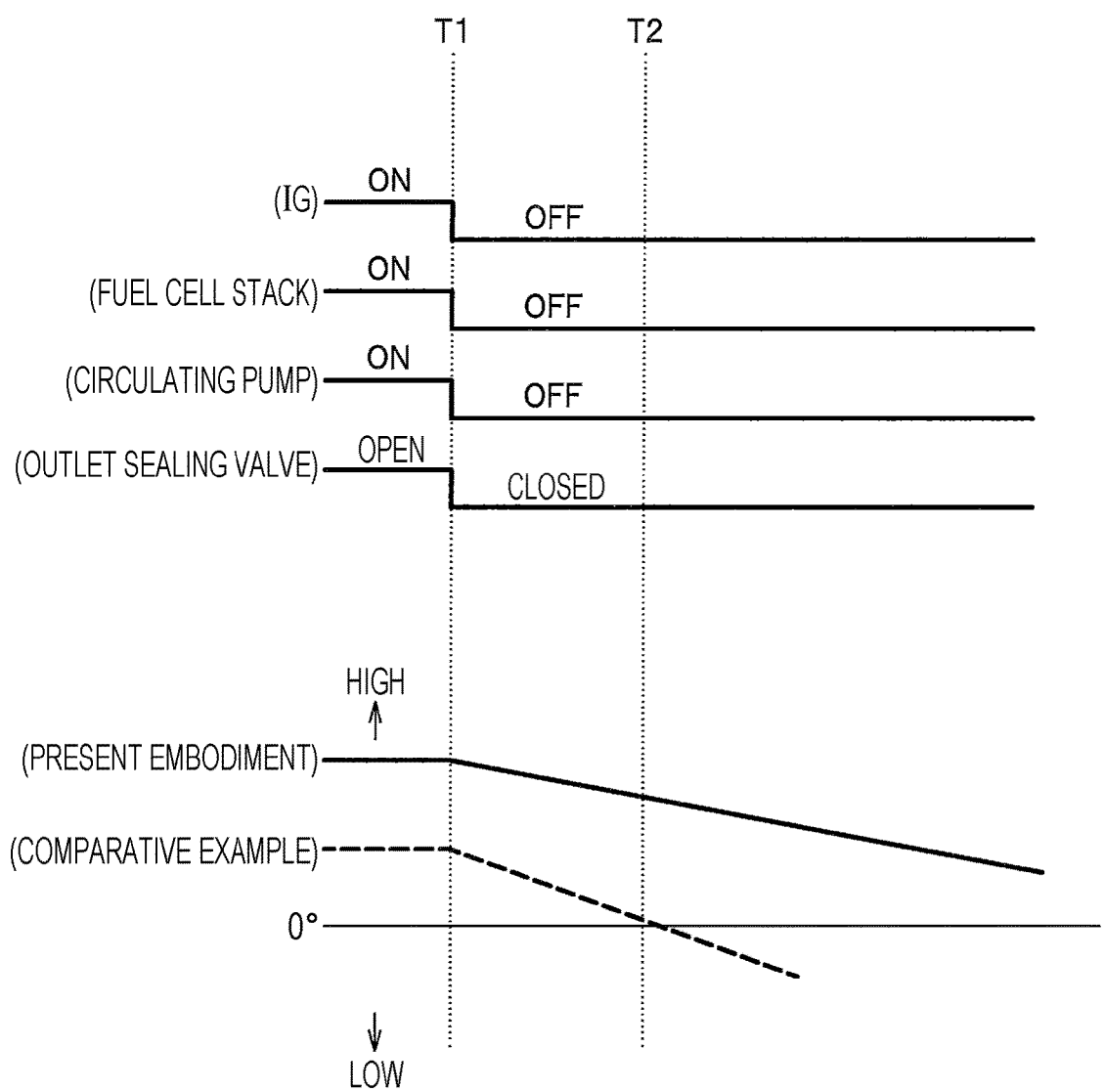
FIG. 10 is a timing diagram showing an example of operation according to the present embodiment.

For this reason, when the ignition switch (IG) of the fuel cell electric vehicle 200 is turned off (at T1 in FIG. 10), the temperature of the valve seat 52 is higher than that of a conventional valve seat (see a comparative example in FIG. 10).

Note that the turn-off of the ignition switch (IG) halts driving of the refrigerant pump 42 and closes the outlet sealing valve 35.

After the ignition switch (IG) of the fuel cell electric vehicle 200 is turned off, the fuel cell system 100 comes to a system halt, the outlet sealing valve 35 is cooled by outside air, and the temperature of the valve seat 52 drops.

Since the outlet sealing valve 35 is covered with the insulation cover 6 and is made harder to cool due to the first inclined surface 72a and the like, the rate of drop in the temperature of the valve seat 52 is lower than that of the conventional valve seat (see the comparative example in FIG. 10).

As seen from the foregoing, according to the present embodiment, even after the fuel cell system 100 halts, and the outlet sealing valve 35 is closed, the temperature of the valve seat 52 is relatively high, and water deposited on the valve seat 52 does not freeze.

As described above, according to the embodiment, it is possible to prevent the valve body 53 from being firmly fixed to the valve seat 52 due to freezing of water and ensure working of the valve body 53.

The embodiment has been described above. The present disclosure, however, is not limited to this.

For example, in the present embodiment, the refrigerant passage 54 is configured to heat the valve seat 52. In the present disclosure, however, the refrigerant passage 54 may be provided in the vicinity of the valve body 53 to heat the valve body 53.

An outlet sealing valve according to the present disclosure is not limited to the one described in the embodiment. The outlet sealing valve may be a solenoid valve or the like and is not particularly limited.

The resin cover 9 may be used to hold the second insulation cover 8.

Additionally, the second insulation cover 8 may be held by the humidifier 33.

A fuel cell system according to the present disclosure includes a fuel cell stack, an oxidant gas supply channel through which oxidant gas to be supplied to the fuel cell stack flows, an oxidant off-gas exhaust channel through which oxidant off-gas exhausted from the fuel cell stack flows, an outlet sealing valve which is provided in the oxidant off-gas exhaust channel, and a refrigerant exhaust channel through which a refrigerant exhausted from the fuel cell stack flows. The outlet sealing valve includes a main body portion having a passage through which the oxidant off-gas flows, a valve seat which is provided in the passage, a valve body which is provided in the passage and is seated on the valve seat to close the passage, and a refrigerant passage which is located in the vicinity of the valve seat or in the vicinity of the valve body and through which a branch of the refrigerant from the refrigerant exhaust channel flows.

According to the disclosure, during operation of the fuel cell system, a refrigerant having absorbed heat of the fuel cell stack flows through the refrigerant passage to heat the valve seat or the valve body. Even after the fuel cell system comes to a system halt, and the output sealing valve is closed, temperature of the valve seat or the valve body is relatively high.

For this reason, even if water is deposited across the valve body and the valve seat, water deposited on the valve seat or water deposited on the valve body is hard to freeze.

As seen from the foregoing, the valve body is not firmly fixed to the valve seat, and working of the valve body can be ensured.

In the disclosure, the fuel cell system preferably includes an insulation cover which covers the main body portion.

According to the above-described configuration, even after the fuel cell system comes to a system halt (after refrigerant supply to the refrigerant passage is halted), the main body portion (the valve seat) covered with the insulation cover is harder to cool. This allows prevention of the valve body from being firmly fixed to the valve seat.

In the disclosure, it is preferable that the insulation cover includes an upper wall portion which covers an upper side of the main body portion and a lower wall portion which covers a lower side of the main body portion and that an inclined surface is formed at at least part of an upper surface of the upper wall portion and an upper surface of the lower wall portion.

Since water has relatively high thermal conductivity, if water is deposited on the insulation cover, the insulation cover is likely to be cooled by outside air. However, according to the above-described configuration, the inclined surface is formed at the upper surface. Even if water is deposited on the upper surface due to condensation, water is likely to flow down. Thus, water deposited on the insulation cover decreases, the insulation cover is harder to cool, and the main body portion (the valve seat) has an excellent heat retaining property.

In the disclosure, the fuel cell system preferably includes a resin cover which is attached to the main body portion and holds the insulation cover sandwiched between the resin cover and the main body portion.

According to the above-described configuration, the insulation cover can be brought into close contact with the main body portion without space, which makes the main body portion harder to cool.

In the disclosure, it is preferable that the fuel cell system includes a humidifier which humidifies air and that the humidifier is arranged closer to the fuel cell stack than the outlet sealing valve.

According to the above-described configuration, the humidifier larger in volume than the sealing valve is located on the fuel cell stack side, which improves space efficiency and achieves miniaturization.

In the disclosure, it is preferable that the insulation cover includes a first insulation cover which is arranged on an opposite side of the main body portion from the fuel cell stack and a second insulation cover which is arranged on a same side of the main body portion as the fuel cell stack and that the second insulation cover is sandwiched between at least one of the humidifier, a piece of piping constituting the oxidant gas supply channel, and a piece of piping constituting the oxidant off-gas exhaust channel, and the main body portion.

The above-described configuration allows the second insulation cover to come into close contact with the main body portion without space. A member for bringing the second insulation cover into close contact is unnecessary, and the number of components can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
a fuel cell stack;
an oxidant gas supply channel through which oxidant gas to be supplied to the fuel cell stack flows;
an oxidant off-gas exhaust channel through which oxidant off-gas exhausted from the fuel cell stack flows;
an outlet sealing valve which is provided in the oxidant off-gas exhaust channel; and
a refrigerant exhaust channel through which a refrigerant exhausted from the fuel cell stack flows, wherein
the outlet sealing valve includes
a main body portion having:
a passage through which the oxidant off-gas flows; and
a refrigerant passage through which a branch of the refrigerant from the refrigerant exhaust channel flows,
a valve seat which is provided in the passage, and
a valve body which is provided in the passage and is seated on the valve seat to close the passage, wherein
the refrigerant passage is located in the vicinity of the valve seat or in the vicinity of the valve body.

2. The fuel cell system according to claim 1, further comprising:
an insulation cover which covers the main body portion.

3. The fuel cell system according to claim 2, wherein the insulation cover includes
an upper wall portion which covers an upper side of the main body portion and
a lower wall portion which covers a lower side of the main body portion, and
an inclined surface is formed at at least part of an upper surface of the upper wall portion and an upper surface of the lower wall portion.

4. The fuel cell system according to claim 2, further comprising:
a resin cover which is attached to the main body portion and holds the insulation cover sandwiched between the resin cover and the main body portion.

5. The fuel cell system according to claim 2, further comprising:
a humidifier which humidifies air, wherein
the humidifier is arranged closer to the fuel cell stack than the outlet sealing valve.

6. The fuel cell system according to claim 5, wherein the insulation cover includes
a first insulation cover which is arranged on an opposite side of the main body portion from the fuel cell stack and
a second insulation cover which is arranged on a same side of the main body portion as the fuel cell stack, and
the second insulation cover is sandwiched between at least one of the humidifier, a piece of piping constituting the oxidant gas supply channel, and a piece of piping constituting the oxidant off-gas exhaust channel, and the main body portion.

7. A fuel cell system comprising:
a fuel cell stack;
an oxidant gas supply channel through which oxidant gas flows to the fuel cell stack;
an oxidant off-gas exhaust channel through which oxidant off-gas is discharged from the fuel cell stack;
a refrigerant exhaust channel through which a refrigerant is discharged from the fuel cell stack; and
an outlet sealing valve provided in the oxidant off-gas exhaust channel and comprising:
a main body having:
a passage through which the oxidant off-gas flows; and
a refrigerant passage which is branched off from the refrigerant exhaust channel and through which the refrigerant flows;
a valve seat provided in the passage; and
a valve body provided in the passage to be seated on the valve seat to close the passage, wherein
the refrigerant passage is provided such that the refrigerant flows through the refrigerant passage in a vicinity of at least one of the valve seat and the valve body.

8. The fuel cell system according to claim 7, further comprising:
an insulation cover which covers the main body.

9. The fuel cell system according to claim 8, wherein the insulation cover includes
an upper wall portion which covers an upper side of the main body and
a lower wall portion which covers a lower side of the main body, and
an inclined surface is formed at at least part of an upper surface of the upper wall portion and an upper surface of the lower wall portion.

10. The fuel cell system according to claim 8, further comprising:
a resin cover which is attached to the main body and holds the insulation cover sandwiched between the resin cover and the main body.

11. The fuel cell system according to claim 8, further comprising:
a humidifier which humidifies air, wherein
the humidifier is arranged closer to the fuel cell stack than the outlet sealing valve.

12. The fuel cell system according to claim 11, wherein the insulation cover includes
a first insulation cover which is arranged on an opposite side of the main body with respect to the fuel cell stack and
a second insulation cover which is arranged on a same side of the main body as a side on which the fuel cell stack is arranged, and
the second insulation cover is sandwiched between the main body and at least one of the humidifier, a piece of piping constituting the oxidant gas supply channel, and a piece of piping constituting the oxidant off-gas exhaust channel.

* * * * *